United States Patent [19]

Taghezout

[11] Patent Number: 5,113,100

[45] Date of Patent: May 12, 1992

[54] ENERGIZATION COIL DEVICE, A METHOD OF MAKING SUCH A DEVICE AND AN ELECTROMAGNETIC MICROMOTOR FITTED THEREWITH

[75] Inventor: Daho Taghezout, Lausanne, Switzerland

[73] Assignee: Eta SA Fabriques d'Ebauches, Switzerland

[21] Appl. No.: 664,002

[22] Filed: Feb. 28, 1991

[30] Foreign Application Priority Data

Mar. 2, 1990 [FR] France ............................ 90 02772

[51] Int. Cl.$^5$ ..................... H02K 11/00; H01L 23/48
[52] U.S. Cl. .............................. 310/40 MM; 310/71; 361/393; 357/71
[58] Field of Search ................... 310/40 MM, 71, 268, 310/68 R, DIG. 6, 45, 179, 184; 361/393; 357/51, 68, 71; 437/51, 81

[56] References Cited

U.S. PATENT DOCUMENTS

| | | | |
|---|---|---|---|
| 4,410,251 | 10/1983 | Lee | 354/25 |
| 4,733,115 | 3/1988 | Barone et al. | 310/68 R |
| 4,770,640 | 9/1988 | Walter | 361/393 |
| 4,975,760 | 12/1990 | Dohjo et al. | 357/71 |
| 4,998,159 | 3/1991 | Shinohara et al. | 357/71 |

FOREIGN PATENT DOCUMENTS

| | | | |
|---|---|---|---|
| 287945 | 10/1988 | European Pat. Off. | 310/40 MM |
| 668160 | 12/1988 | Switzerland | 310/40 MM |

*Primary Examiner*—Steven L. Stephan
*Assistant Examiner*—Matthew Nguyen
*Attorney, Agent, or Firm*—Sughrue, Mion, Zinn Macpeak & Seas

[57] ABSTRACT

The energization coil device provided by the invention comprises a planar support element (30) consisting of a semi-conductive substrate, and at least one planar coil (BI) formed on a first layer (CI) in the vicinity of one surface (F1) of the substrate. The device is characterized in that it further comprises at least one second planar coil (BS) formed in the vicinity of said one surface (F1) of the substrate on a second layer (CS) superposed on the first layer (CI), these coil layers (CI, CS) forming a monolithic and integrated arrangement of several, respectively upper and lower, adjacent layers in one substrate. The device is primarily intended for use in a polyphase electromagnetic micromotor intended to operate as a stepping motor, a continuous rotation motor or a bidirectional motor.

11 Claims, 7 Drawing Sheets

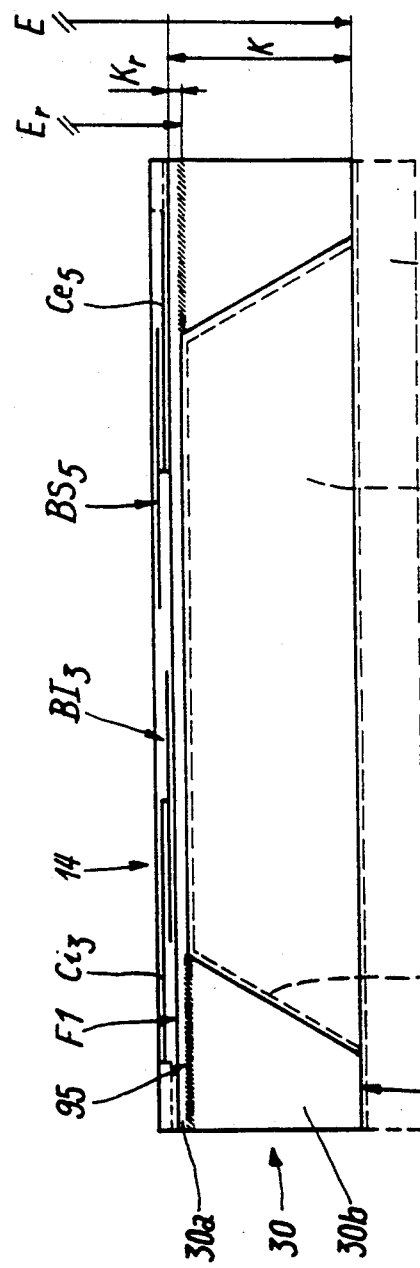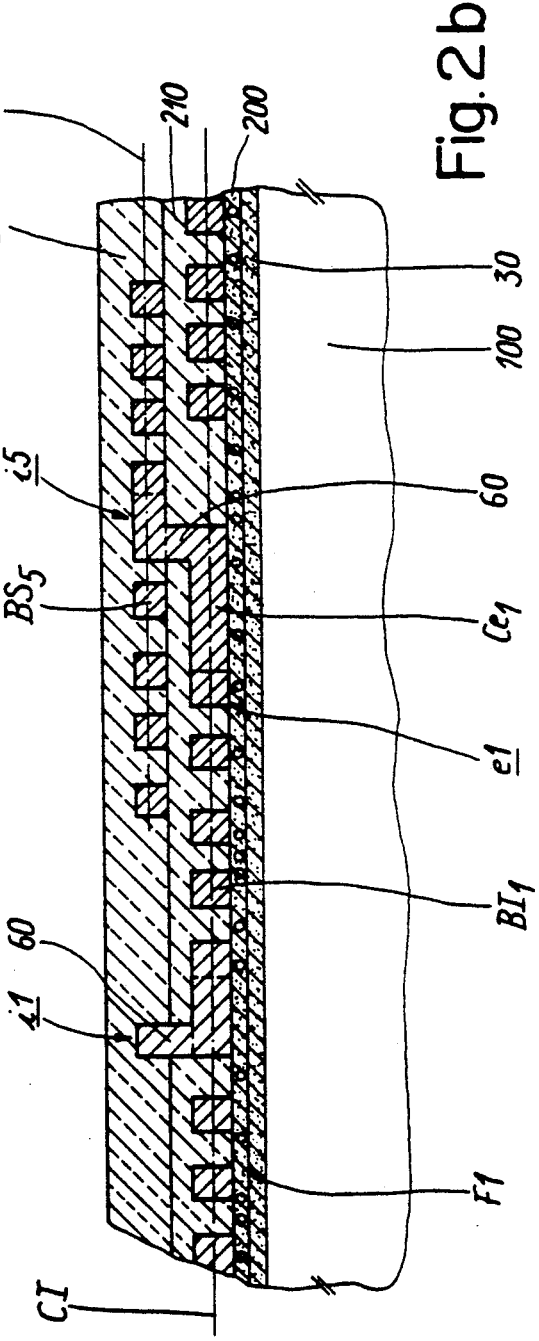

ENERGIZATION COIL DEVICE, A METHOD OF MAKING SUCH A DEVICE AND AN ELECTROMAGNETIC MICROMOTOR FITTED THEREWITH

BACKGROUND OF THE INVENTION

The invention relates to an energization coil device, preferably intended for use in a micromotor of the electromagnetic type, and to a method of making such a device.

It also relates to a micromotor that is fitted with such a device and which is intended for use in many kinds of applications where electromagnetically controlled power transducers need to be highly miniaturized. These applications include for instance horology, robotics, informatics, electronic apparatus for reproducing sound and images, aeronautics, aerospace and biomedical engineering.

This type of motor is called micromotor because, as will become apparent hereinafter, some of its components have minute dimensions, of the order of one micron ($10^{-6}$ meter).

Like any electromagnetic motor, such micromotors comprise a first, stator-forming part and a second, rotor-forming part which is mobile in relation to the first. The rotor generally comprises a permanent magnet. In addition, these motors are generally provided with a plurality of energization coils each formed by a winding of electrical conductor. Such coils are magnetically coupled to the rotor and are electrically connected to an electronic control circuit that provides them with current pulses, known as drive pulses, that enable the rotor to be set in motion.

With a view to improving the miniaturization of such electromagnetic motors, it has already been proposed to produce coils in one plane, by means of spiral windings, such coils, termed "pancake coils" because of their coplanar arrangement, having little thickness. In this case, the rotor is produced in the form of a thin, axially magnetized disc which sets up, in the air gap of the magnetic circuit, axial fields extending through the coils, with the latter being arranged in a plane parallel to the rotor.

The first coils of this type were made of very fine copper wire. They were difficult to make and to connect to one another and to the control circuit, and were therefore hardly ever used because the cost of manufacturing them was very high.

More recently, it has been suggested, as described for example in U.S. Pat. No. 4,733,115, to produce coils on a printed circuit. Whilst satisfactory for making small motors, this technique cannot unfortunately be used in the production of micromotors as it does not enable coils to be made having sufficiently fine turns and hence the motor to be efficient.

To resolve this problem, it has also been suggested, in published Swiss patent application 668 160, to produce energization coils on a silicon plate, also termed a semiconductor substrate, in accordance with integrated circuit technology.

This technology offers many advantages over the printed circuit one since with it coils can be produced with turns formed by an aluminium conductor having an extremely low height and width, of the order of $2 \cdot 10^{-6}$ meter (2 $\mu$m) and having a resistance in the region of 2000 ohms. And because of this very high resistance the battery current can be limited to a value under one milliampere thereby enabling the driving device, particularly in horological applications, to be associated with a power source of conventional voltage in the region of 1.5 volts.

Moreover, with this technology it is possible to produce coil devices, i.e. modules comprising a substrate and several coils produced in pancake fashion thereon, having a thickness K (FIG. 1) of about $280 \cdot 10^{-6}$ meter (280 $\mu$m).

It will thus be appreciated that with such dimensions it does become possible to talk of miniaturization and of "micro"-motors particularly suited to applications such as horology or biomedical engineering.

However, it has now been found that such micromotors with integrated coils are clearly of inadequate efficiency, with the result that it was not feasible to consider putting them into production and on the market.

Besides, in view of the diversity of fields of application open to these motors, it would be desirable for these motors to operate either as unidirectional or bidirectional stepping motors or as unidirectional or bidirectional continuous rotation motors, at will.

If the motor described in the above Swiss patent application can reasonably be expected to be used as a stepping motor, it must however be acknowledged that it cannot at will be used as a continuous rotation motor or as a bidirectional motor.

This is because this type of motor is single-phased, and therefore would, for one thing, require highly complex and hence costly electronics if it were required to operate as a bidirectional motor. For another, the control of the rotor's position would necessitate resorting to feedback loops that involve sophistications that are equally onerous if the motor were required to operate as a continuous rotation motor.

SUMMARY OF INVENTION

Thus, an object of the invention is to do away with these drawbacks by proposing a highly miniaturized energization coil device that is sufficiently efficient to be of commercial interest and whose construction would enable a micromotor fitted with such a device to be used at will as a unidirectional or bidirectional stepping motor or as a unidirectional or bidirectional continuous rotation motor, without increasing production costs.

The invention therefore provides an energization coil device for an electromagnetic micromotor, comprising:

a substantially planar support element, consisting of a semi-conductive substrate for instance intended to be mechanically connected to a relatively fixed element, at least one first planar coil produced by metallization on a first layer in the vicinity of one surface of said substrate, characterized in that it includes at least one second planar coil produced in the vicinity of said one surface of the semi-conductive substrate, on a second layer that is superposed on the first, said coil layers forming a monolithic and integrated arrangement of adjacent upper and lower layers on a common substrate.

As a result, the micromotor's efficiency can be considerably improved, particularly through the combined action of the superposed coils, without substantially increasing the motor's thickness.

The invention further relates to a method of making an energization coil device which comprises forming on one face of a semi-conductive substrate, by a photo-lithographic process termed surface micro-machining:

a first layer of coils and simultaneously some of the leads connecting the coils with a control circuit and/or the other coils, possibly one or more "inter-planar" junctions, and superposed on the first layer of coils, a second layer of coils along with a number of these coils' leads.

This enables a polyphase type motor to be produced having a better efficiency than a single-phase motor and capable of being used, in conjunction with an electronic control circuit of simple construction,(a) as a stepping motor, (b) as a continuous rotation motor or (c) as a bidirectional motor.

BRIEF DESCRIPTION OF THE DRAWINGS

Other features and advantages of the invention will become apparent on reading the following detailed description with reference to the accompanying drawings which are given solely by way of example and wherein:

FIG. 2a is a section along line IIa—IIa of FIG. 2;

FIG 2b is a section along line IIb—IIb of FIG. 2;

DETAILED DESCRIPTION

Figure 1:
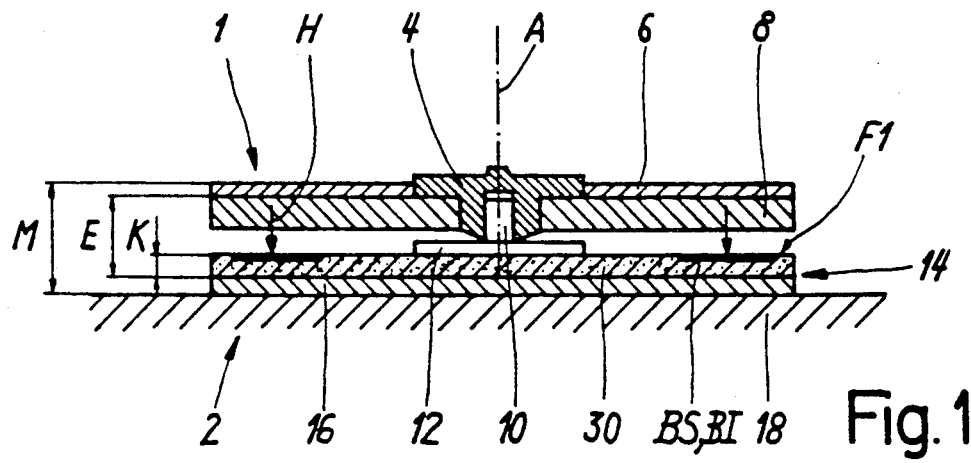
FIG. 1 is a cross-section of a micromotor according to the invention.

Referring now to FIG. 1, there is shown a micromotor according to the invention that can be fitted with an assembly of energization coils such as any one of those shown in FIGS. 2 to 5.

The FIG. 1 micromotor comprises a rotor-forming movable element able to pivot on and relatively to a stator-forming fixed element 2 about a geometrical axis of rotation A.

Rotor 1 comprises a circular bearing-forming sleeve 4 on which are fixedly mounted, side by side, a disc 6 of magnetically soft material having high magnetic permeability and a magnetized disc 8 provided with a number of magnetic poles of alternate polarity arranged in the vicinity of its periphery.

The bearing-forming sleeve 4 is pivotally mounted on a stud 10 having a base 12 which in the present instance is laid and fixedly mounted on an energization coil device 14.

Besides the device 14 and the stud and base element 10–12, stator 2 includes a circular disc 16 of magnetically soft material having high magnetic permeability on the rear surface of device 14, between the latter and a support member 18.

The space between discs 6 and 16 provides an air-gap E in which magnetized disc 8 and coil device 14 are disposed opposite one another.

The magnetized disc 8, which may be made of ferrite or samarium-cobalt, defines magnetic poles that set up magnetic fields H in air-gap E, in particular where coils BS and BI of device 14 are located, as will be explained hereinafter.

The magnetic fields H all have substantially the same orientation, parallel to the rotational axis of rotor 1, the direction of these axial fields being however alternated. Outside the air-gap, the magnetic fields H are channelled from one magnetic pole to an adjacent pole through discs 6 and 16.

The operation of such a micromotor is that of a conventional electromagnetic motor and will therefore not be described here in detail.

Figure 2C:
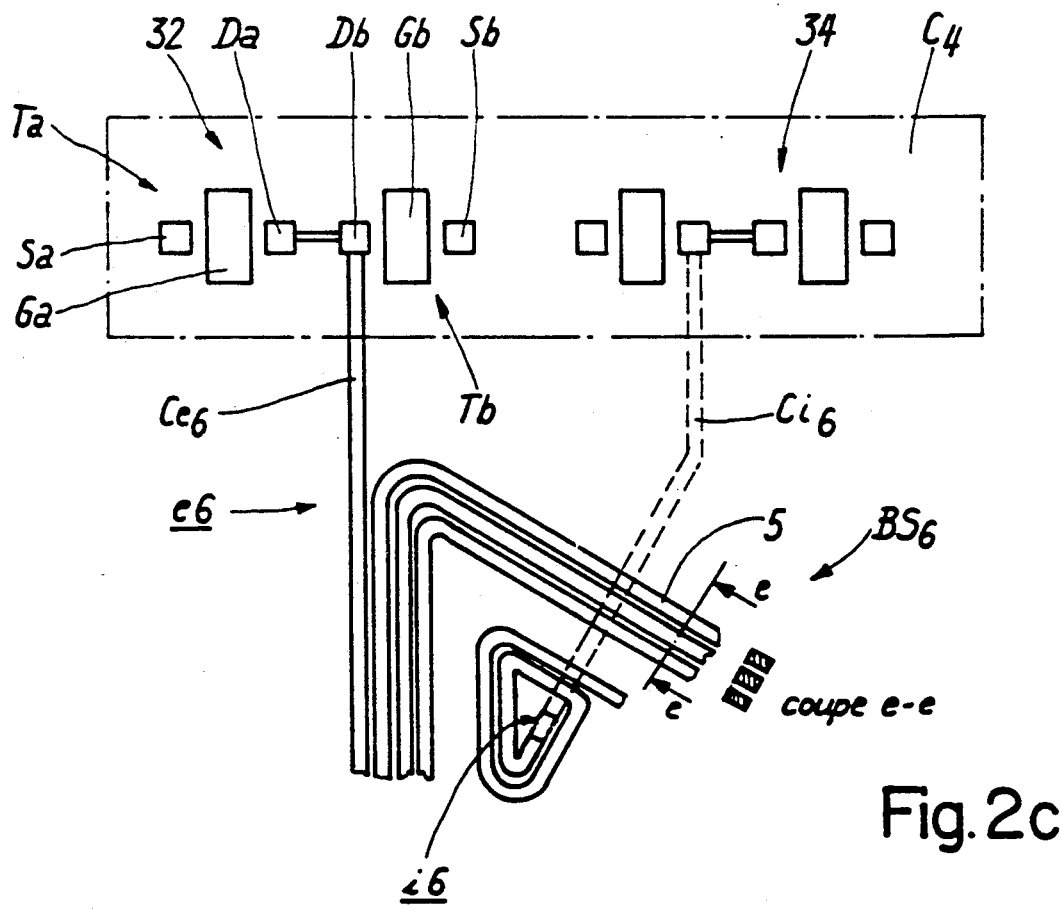
FIG. 2c is a more detailed view of one of the coils of the FIG. 2 device, along with its control element.
Figure 2:
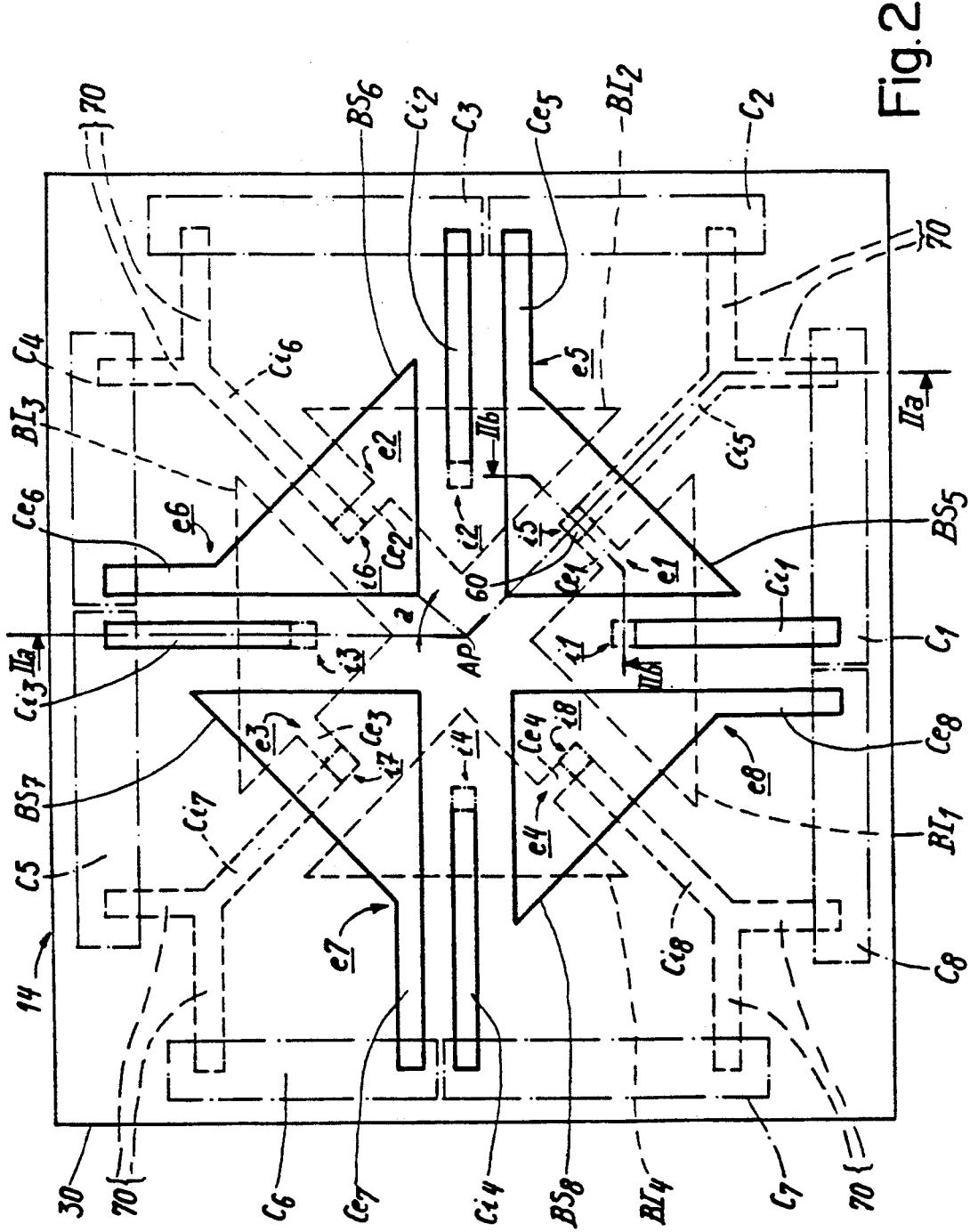
FIG. 2 is a very diagrammatic plan view of a first embodiment of an energization coil device according to the invention, for use with the FIG. 1 micromotor.

Referring now to FIGS. 2, 2a and 2b, there is shown a first embodiment of an energization coil device 14 according to the invention.

Device 14 comprises a substantially planar support element 30 formed of a silicon plate generally called a semi-conductive substrate. In this embodiment, semi-conductive substrate 30 is shaped as a parallelogram but it may of course have a circular shape. On one surface F1 (FIG. 1) of semi-conductive substrate 30, preferably that facing magnetized disc 8 of rotor 1, are provided (FIG. 2) several coils $BI_n$, in broken lines, and BSn, in full lines, which are here shown very diagrammatically in plan view in the form of triangles.

In FIG. 2, as in the following figures, the coils shown in broken lines form a first group of coils $BI_1$ to $BI_4$ (referenced $BI_{1-4}$), termed lower coils.

Coils $BI_{1-4}$, here numbering four, are arranged in relation to each other in substantially coplanar manner, with their windings being such as preferably to each have the shape of a quasi isosceles triangle. This first group of coils $BI_{1-4}$ thus forms on semi-conductive substrate 30 part of a first, lower, layer CI, as shown in FIG. 2b.

Device 14 comprises to advantage a second group of coils $BS_5$ to $BS_8$ (referenced $BS_{5-8}$), also provided on surface F1 of semi-conductive substrate 30.

This second group of coils $BS_{5-8}$ is thus produced, like the above first group, on the surface of semi-conductive substrate 30 that preferably faces rotor 1. This second group of coils $BS_{5-8}$ forms a second, upper, layer CS over first layer CI. The coils $BS_{5-8}$ of the second group have much the same shape as the lower coils $BI_{1-4}$ of the first group and also number four in this embodiment. They lie substantially in the same plane in relation to one another and it will be noted that the upper layer CS of coils $BS_{5-8}$ is superposed on lower layer CI.

All coils have leads that enable their outer terminals e and inner terminals i to be connected to control elements $C_1$ to $C_8$ (referenced $C_{1-8}$).

An "outer" lead $Ce_n$ will hereinafter designate an electrical supply path that is connected to an outer terminal of a coil, whereas an "inner" lead $Ci_n$ will designate an electrical supply path that is connected to an inner terminal.

In the embodiment shown in FIG. 2, the eight control elements $C_1$ to $C_8$ enable each coil of the first or second group to be controlled independently of the other coils.

One of these control elements, $C_4$, and one of the coils, $BS_6$, are shown in greater detail in FIG. 2c. Whereas the control elements are supposed in the various illustrated embodiments of the invention to be on the same substrate as the coils, they can be provided on independent substrates.

Control element $C_4$ consists of two inverters 32 and 34 that form part of a control circuit not shown. Such a control circuit generally comprises, in a horological application, a time base that is frequency stabilised by a quartz resonator, a frequency divider and a circuit for shaping the signals driving inverters 32 and 34. Inverters 32 and 34 thus supply polarized drive pulses to the coils and in this particular case to coil $BS_6$. This control circuit, of which inverters 32 and 34 form part, is supplied with energy by a battery fitted, say, in a watch. The operation and structure of these elements being well known per se will not be described further.

Inverters 32 and 34 have identical structures. Each inverter is made up of a pair of complementary CMOS transistors Ta and Tb, each transistor having a source, a gate and a drain, respectively referenced Sa, Ga and Da in the case of the first transistor Ta, and Sb, Gb and Db in the case of the second transistor Tb. Drains Da and Db are connected to each other and form the output of inverter 32. This output is connected to the outer terminal $e_6$ of coil $BS_6$ via an outer lead $Ce_6$, whereas the output of inverter 34 is connected to the outer terminal $i_6$ of coil $BS_6$ via an inner lead $Ci_6$.

As shown in FIG. 2c, the energization coils are each formed by the coaxial and planar winding of an electric conductor 5 having a substantially rectangular cross-section. As will hereinafter become apparent, this conductor 5 and preferably the leads $Ce_n$ and $Ci_n$ to which it is connected consist of tracks or metallizations structured by a photolithographic process.

Referring back to FIG. 2, it will be noted that the outer terminals e1, e2, e3 and e4 of the lower group coils $BI_{1-4}$ are respectively connected by "inter-planar" junctions 60 to the inner terminals i5, i6, i7 and i8 of the adjacent upper group coils $BS_{5-8}$. In the FIG. 2 embodiment, the outer terminals of the coils on lower plane CI are respectively connected to the inner terminals of the adjacent coils on upper plane CS, but a reverse arrangement could also have been adopted, i.e. the connection of the outer terminals of the upper group coils to the associated inner terminals of one of the coils of the lower group. By "inter-planar" junctions, as shown in cross-section at 60 in FIG. 2b and in plan view, in chain-dotted lines of medium thickness, in FIG. 2, is meant electrical connections that are formed by vertical metallizations between upper plane CS and lower plane CI and which thus extend in a direction perpendicular to these planes.

The outer terminals e1 to e4 of lower coils $BI_1$ to $BI_4$ are connected to associated "inter-planar" junctions 60 by outer leads $Ce_1$ to $Ce_4$ which provide an electrical connection between the lower coils $BI_{1-4}$ and the corresponding upper coils $BS_{5-8}$.

Further, each "inter-planar" junction 60 is connected to a lead extending outwardly away from the coil groups. In this case, it is leads $Ci_5$ to $Ci_8$ that connect inner terminals i5 to i8 of upper group coils $BS_5$ to $BS_8$ to the associated control elements.

Leads $Ci_{5-8}$ each end in a pair of fork portions 70 each connected to one control element $C_{1-8}$. Thus, in any pair of adjacent coils in superposed planes the outer terminal of one and the inner terminal of the other are electrically connected to separate control elements by a lead forming a common supply (leads $Ci_5$ to $Ci_8$), thereby considerably reducing the overall length of the leads having to be provided on semi-conductive substrate 30.

We thus have here paired coils, each pair including a lower coil and an upper coil.

In the present embodiment, all outer leads $Ce_{1-8}$ and inner leads $Ci_{1-8}$, "inter-planar" junctions 60 and fork portions 70 are formed on the semi-conductive substrate 30 using the same technique as for the actual coils. This technique is identical to that used in the manufacture of MOS integrated circuits and involves, firstly, chemically depositing in the vapour phase a plurality of thin-film layers of a conductive, preferably metallic, material, e.g. aluminium. Secondly, it involves structuring, by means of masks and etching operations, e.g. chemical etching operations, the deposited layers so as only to leave certain portions protruding with such portions forming, inter alia, tracks 5 (FIG. 2c) and "inter-planar" junctions 60. The outer and inner leads, the fork portions of these leads and the "inter-planar" junctions have been shown here in a very diagrammatic manner, their cross-section actually being very slight. This cross-section is roughly the same as that of the turns (formed by tracks 5) of each of the upper and lower plane coils, the latter having a height and a width of about $2 \cdot 10^{-6}$ meter (2 microns). Each coil has about 150 turns, with each coil and hence each turn having a resistance of about 2000 ohms. The energization coil device 14 may therefore be supplied with very small currents, less than one milliampere. The micromotor according to the invention can thus be powered by a battery of very low voltage, of the order of 1.5 volts.

In the FIG. 2 embodiment, it will further be noted that each of the inner leads $Ci_{5-8}$ that provides a common supply to a pair of coils in different planes is disposed in the same plane as the coil to whose outer terminal this lead is connected. This is because inner leads $Ci_{5-8}$ are produced in the same plane as the lower plane coils $BI_{1-4}$. Additionally, the outer leads $Ce_{1-4}$ of lower coils $BI_{1-4}$ are provided in the same plane as leads $Ci_{5-8}$. It will also be noted that the inner leads $Ci_{1-4}$ of lower coils Bll 4 lie in the same plane as the upper group coils $BS_{5-8}$, whereas the inner leads $Ci_{5-8}$ of the upper group coils $BS_{5-8}$ lie in the same plane as the lower group coils $BI_{1-4}$. This arrangement is of particular advantage inasmuch as the same mask can be used during metallization for the leads and coils that are provided in one plane, thereby simplifying the masks and reducing manufacturing time and costs.

In the above described arrangement, the first and second layers CI and CS have an equal number n of coils, with n in this instance being equal to 4 and with the coils $BI_{1-4}$ of the first, i.e. bottom, layer CI being angularly offset on the substrate in relation to the coils $BS_{5-8}$ of the second, i.e. upper, layer CS by an angle a of about $180/n$ degrees, i.e. 45°.

A micromotor according to the invention fitted with the above described energization coil device 14 may operate as a stepping motor, a bidirectional motor or a continuous rotation motor without the added need of a complicated electronic control circuit since the device may be supplied by two out of phase currents forming a two-phase supply. Moreover, since this micromotor can operate as a two-phase motor, its efficiency is much better than that of single-phase motors, particularly when operating as a stepping motor.

The invention is of course not limited to the construction of two-phase motors since it is also possible to deposit on semi-conductive substrate 30 many layers of superposed coils suitably offset in relation to each other.

Thus, in the case of a polyphase motor having N phases, the substrate will carry N layers and the angular offset between the coils of adjacent layers that respectively correspond to one phase is $360°/n \times N$.

Coils $BI_{1-4}$ and $BS_{5-8}$ are angularly offset in relation to each other about a geometrical axis AP that is normal to substrate 30 and which is made to coincide with the micromotor's rotational axis A.

The coils are so oriented that the apexes of the triangles they form converge towards one another, towards the central geometrical axis AP.

In this embodiment, the outer supply terminals e1-8 and inner supply terminals i1-8 interchangeably form the input terminals or output terminals for the current. It is however preferable for these terminals and the winding direction of the coils to be so chosen that the currents flowing in the coils that partly overlap one another, i.e. in the adjacent or paired upper and lower coils, should flow in these coils in opposite directions.

Figure 3:
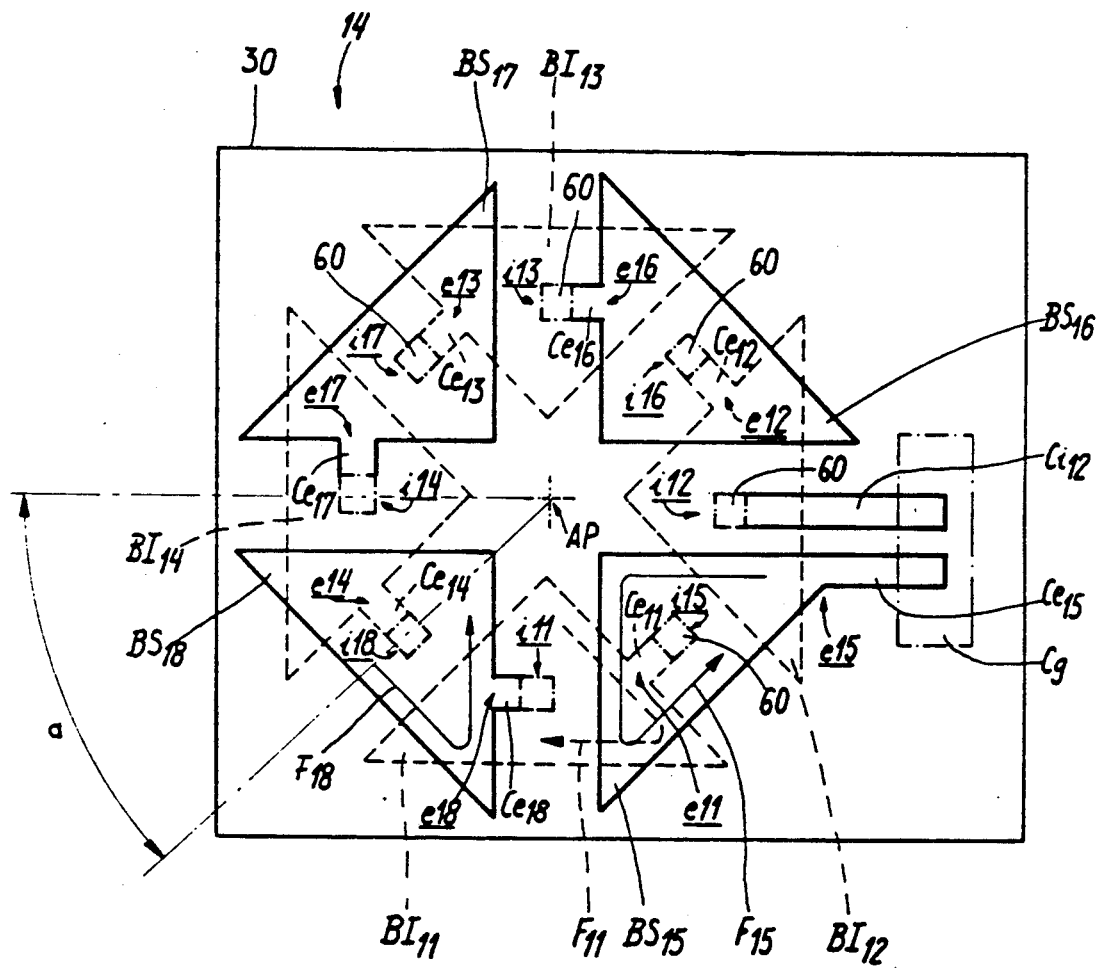
FIGS. 3 and 4 are very diagrammatic plan views of second and third embodiments, respectively, of an energization coil device according to the invention.

Referring now to FIG. 3, there is shown a second embodiment of an energization coil device 14 according to the invention, in which the coils of the upper and lower layers are connected to one another in series. In this embodiment the two groups of coils $BI_{11-14}$ and $BS_{15-18}$ are arranged in the same way as the two groups of coils $BI_{1-4}$ and $BS_{5-8}$ in FIG. 2. The two groups of coils in this second embodiment are oriented and are angularly offset in relation to one another about geometric axis AP in a manner identical to that in the first embodiment. The metallizations 60 between the lower plane CI and the upper plane CS are also represented by chain-dotted lines of medium thickness.

The outer terminals of the coils in one group are respectively connected to the inner terminals of the adjacent coils in the other group, except for coils $BI_{12}$ and $BS_{15}$ in which inner terminal i12 and outer terminal e15 are connected to a single control element $C_9$ identical to control element $C_4$ shown in greater detail in FIG. 2c. It will thus be appreciated that the outer terminals of n−1 coils (three coils in this instance) of one layer, i.e. upper layer CS, are respectively connected to the inner terminals of n−1 coils of the other layer, i.e. lower layer CI. The outer and inner terminals that are connected to one another are here also connected by "inter-planar" junctions 60 which project vertically upwards from the lower terminals and which are orthogonally extended by outer leads $Ce_{11}$ to $Ce_{14}$ and $Ce_{16}$ to $Ce_{18}$ respectively connected to associated outer terminals e11–e14 and e16–e18. Moreover, the outer terminals e11–e14 of the n coils $BI_{11-14}$ of lower layer CI are respectively connected to the inner terminals i15–i18 of the n coils (4) $BS_{15-18}$ of the upper layer CS.

It will be noted that in this embodiment all leads, except two, are extremely short, thus saving on metallization. This is because the inner terminals of the n upper coils and of n−1 lower coils involve no peculiar leads, since these terminals are electrically connected only, through respective metallizations 60 to the outer leads of the adjacent coils in the other plane.

Whereas in the FIG. 2 embodiment the direction in which the coil turns are wound is immaterial since each coil can be supplied independently of the others, in this second embodiment it is preferable for the adjacent coils of different layers, which are superposed and overlap, to be wound in opposite directions. In FIG. 3, arrows $F_{11}$, $F_{15}$, and $F_{18}$ respectively show the direction in which the turns of coils $BI_{11}$, $BS_{15}$ and $BS_{18}$ are wound.

Figure 4:
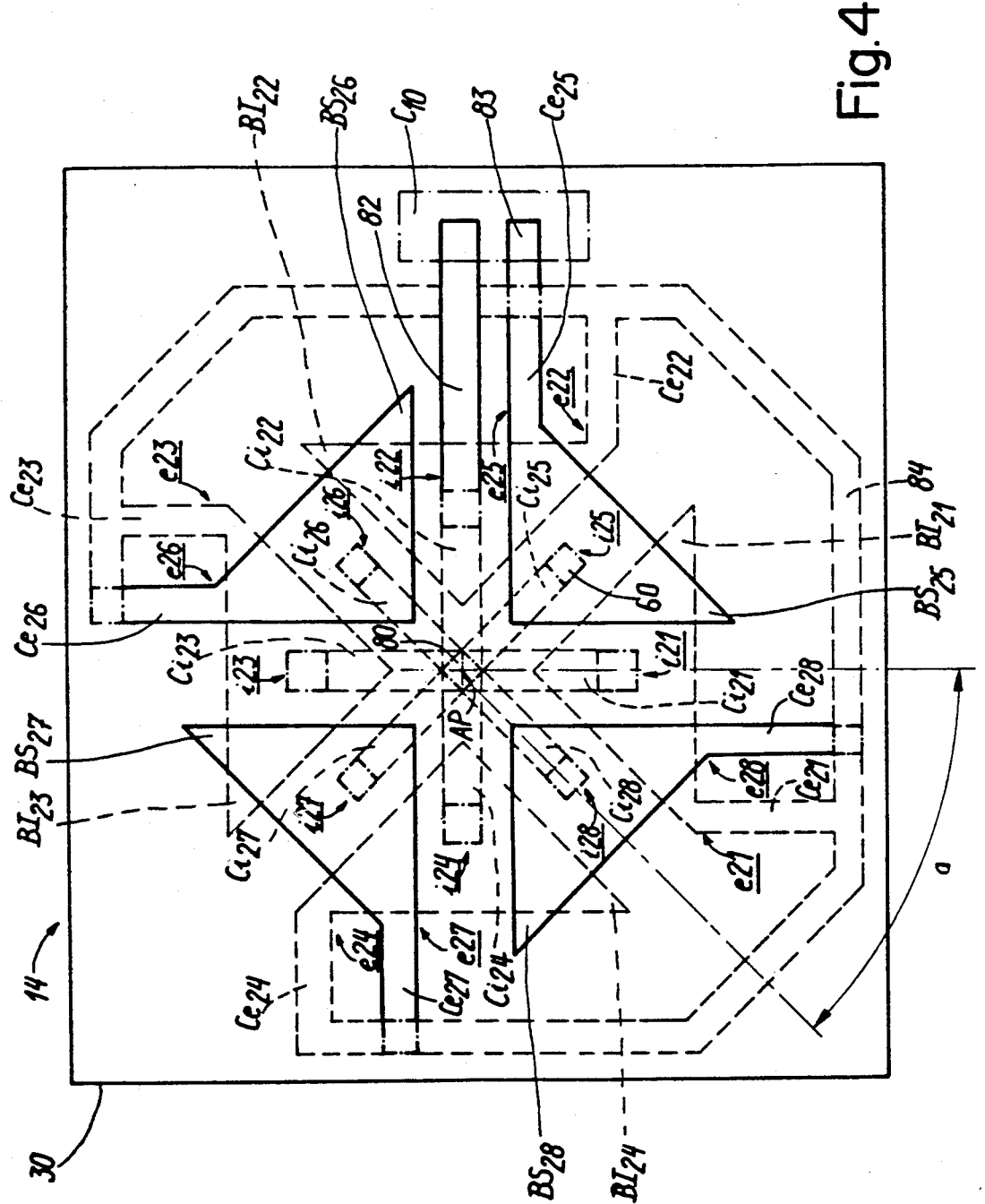

In the third embodiment of the energization coil device 14 according to the invention shown in FIG. 4, all of the coils $BI_{21-24}$ and $BS_{25-28}$, which are arranged in a manner identical to that of the coils in the first two embodiments, are connected in parallel. Here, the inner terminals i21-28 of all this device's coils, i.e. the coils of each group, are connected to one another by inner leads $Ci_{21-28}$ converging towards the centre of device 14 and which are connected to each other, at this point, via a central junction formed by an "inter-planar" junction 80 located substantially at the centre of the semi-conductive substrate 30, on the geometrical axis AP intended to coincide with the rotor's axis of rotation A.

The inner terminals i21 to i28 of all coils are respectively connected to "inter-planar" junctions 60 which are in turn respectively connected to leads $Ci_{21}$ to $Ci_{28}$.

Further, the coils $BI_{21}$ to $BI_{24}$ in lower plane CI are electrically connected to inner leads $Ci_{21}$ to $Ci_{24}$ provided in the upper plane, and conversely with the coils $BS_{25}$ to $BS_{28}$ in the upper plane.

Thus, with both layers, each coil is provided in a plane other than that of the inner lead associated therewith.

An inner terminal of one coil, here $BI_{22}$, has an additional lead 82 coextensive with the inner lead $Ci_{22}$ of this coil. This additional lead 82 extends outwardly of the energization coil device 14 and is connected to a single control element, C10. Further, all outer terminals e21 to e28, i.e. the outer terminals of lower coils $BI_{21-24}$ and upper coils $BS_{25-28}$, are connected to one another by a peripheral lead 84 which partially surrounds the coils and which is connected to control element $C_{10}$ by one of the outer leads, i.e. lead $Ce_{25}$ and an extension 83 thereof.

In this embodiment, the outer terminals of upper coils $BS_{25}$ to $BS_{28}$ are respectively connected to outer leads $Ce_{25-28}$ provided in the upper plane, and the outer terminals of lower coils $BI_{21}$ to $BI_{24}$ are respectively connected to outer leads $Ce_{21-24}$ provided in the lower plane. Thus each coil is produced in the same plane as the outer lead associated therewith.

The peripheral lead 84, in this embodiment, is provided in lower plane CI. It is thus directly connected to the outer leads $Ce_{21}$ to $Ce_{24}$ of the lower coils, whereas it is connected to the outer leads $Ce_{25}$ to $Ce_{28}$ of the upper coils via "inter-planar" junctions 60 respectively provided at the ends of leads $Ce_{25-28}$.

It will also be noted that additional lead 82 is provided in a plane above that of peripheral lead 84.

In this embodiment the outer and inner terminals can equally well act as current input or output terminals. It is however preferable for overlapping coils located on different layers to be wound in opposite directions (the origin of a winding direction being conventionally at the centre of the coil, i.e. its inner terminal.

Figure 5:
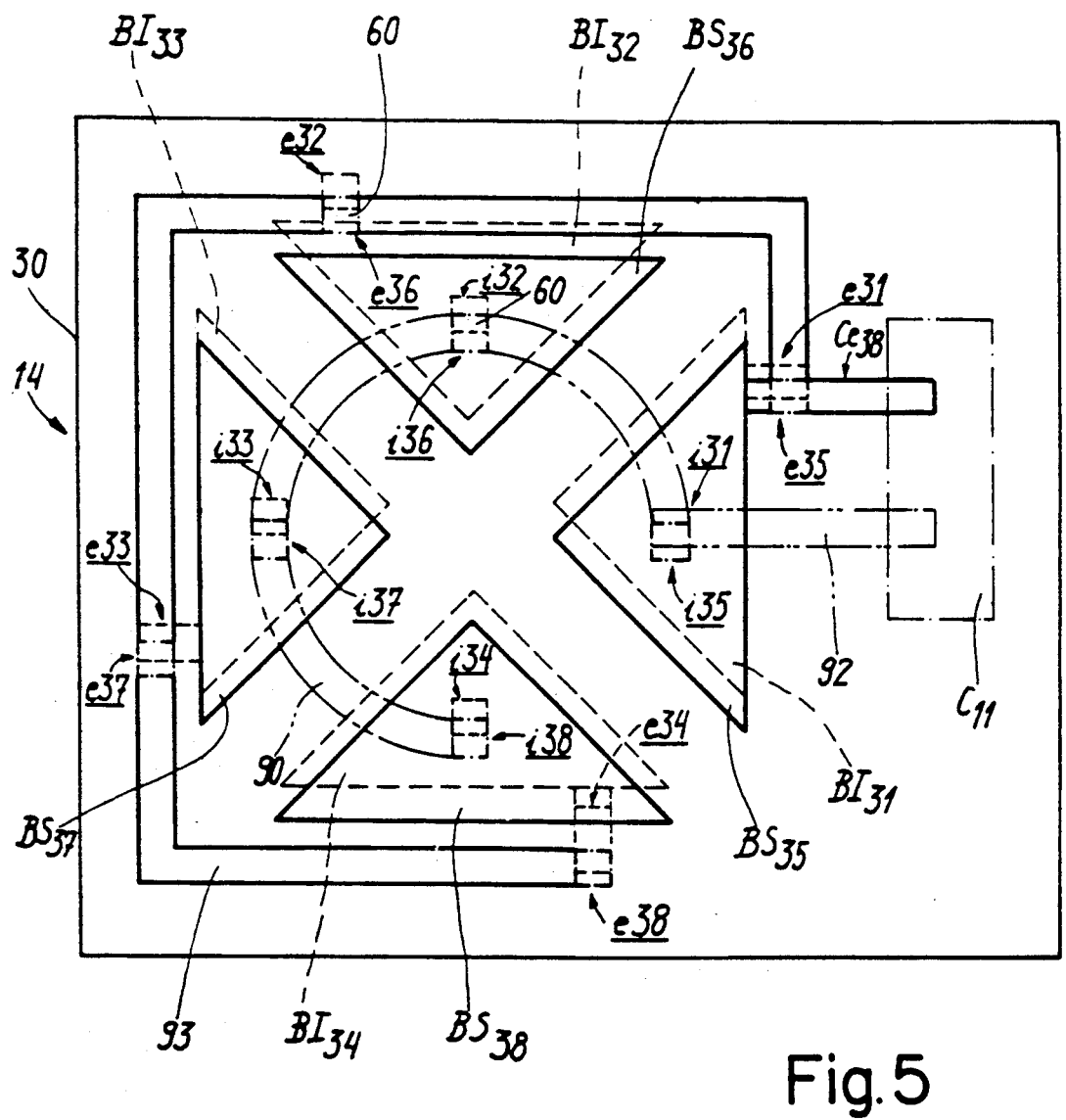
FIG. 5 shows, diagrammatically also, a fourth embodiment of an energization coil device according to the invention, but in which the coils of the lower layers, which are shown in broken lines, have been substantially offset in relation to the coils of the upper layers for a better understanding of the drawings.

FIG. 5 illustrates a fourth embodiment of the energization coil device 14 according to the invention. In this embodiment the coils of one group, e.g. the upper group, are disposed coaxially with the coils of the other group, whereby coils $BS_{35-38}$ of the upper group are arranged exactly over the coils $BI_{31-34}$ of the lower group. Thus the outer and inner terminals of the coils in one plane are disposed opposite the outer and inner terminals of the coils in the other plane. Each outer terminal in the lower plane is thus connected by an "inter-planar" junction 60 to a corresponding outer terminal that lies directly above it, in coincidence, in the upper plane, and each inner terminal in the lower plane being connected in identical fashion to a superposed inner terminal in the upper plane.

In FIG. 5, the coils $BI_{31-34}$ of lower layer CI have been shown substantially offset in relation to the coils $BS_{35-38}$ of upper layer CS solely for a better understanding of the drawing. These coils are all connected in parallel, with inner terminals i31–i38 being connected to one another for example by a diffused conduction channel 90, e.g. of the (p) type, this lead 90 passing beneath the lower coils $BI_{31-34}$.

Conduction channel 90 may be provided by a structured metallization, or track, forming a layer subjacent the two coil layers.

Moreover, the inner terminal of one of the lower coils, e.g. coil $BI_{31}$, is connected to a control element $C_{11}$ via a lead 92 also consisting of a diffused conduction channel or by a subjacent metallization. As in the preceding embodiment, outer terminals e31–e38 are all connected to one another by a partial peripheral lead 93 provided, here, in upper plane CS. The outer and inner terminals can equally well act a current input or output. However, the turns of the superposed coils must be wound in identical directions (in relation to the origin formed by the inner terminal of these coils). In this embodiment, a particularly high efficiency can be obtained through cooperation between the superposed coils of each group. Of course this stacking of coils on one silicon plate 30 is not limited to two layers but can apply to several.

Figure 6:
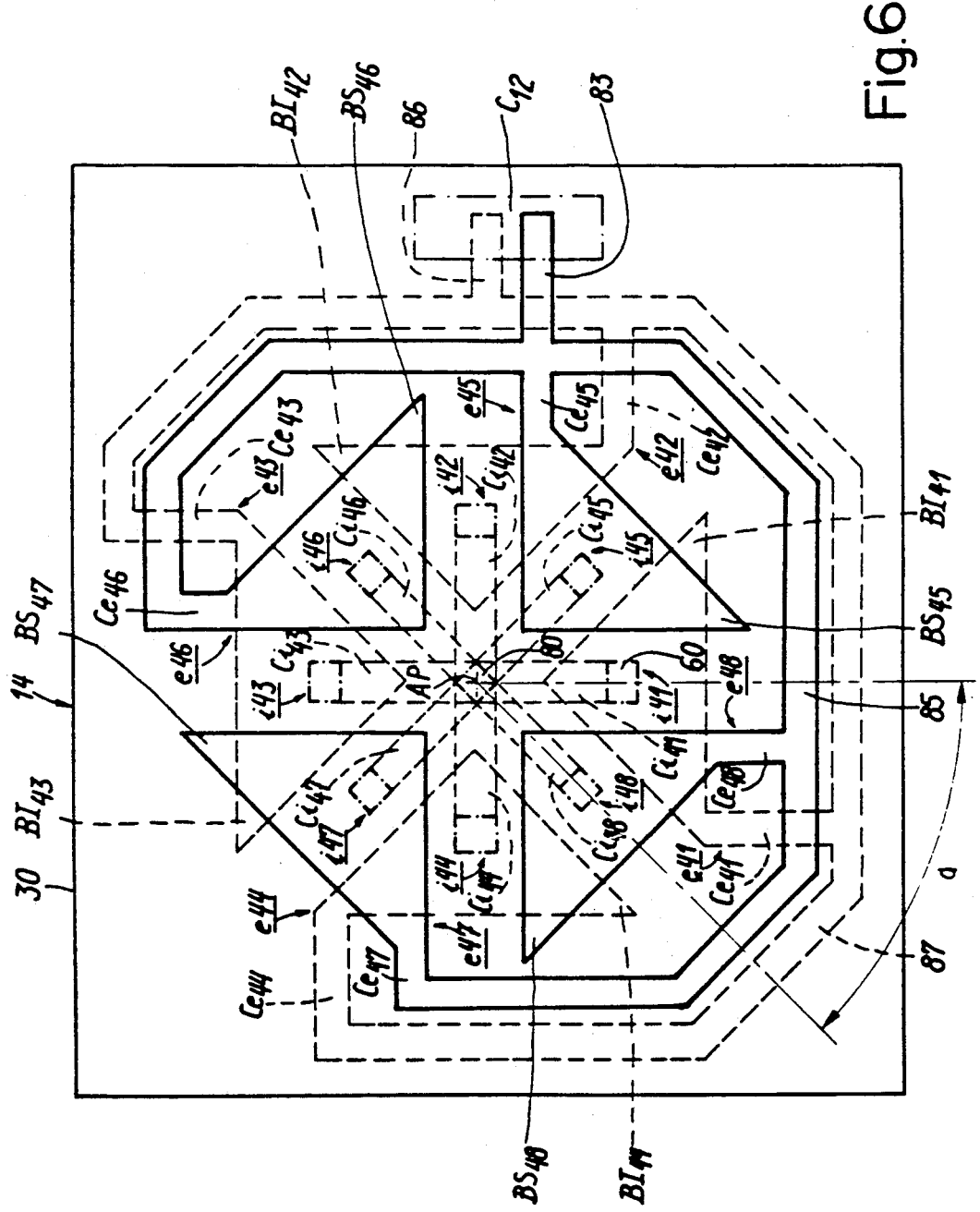
FIG. 6 is a plan view of a fifth embodiment of an energization coil device according to the invention.

Referring now to FIG. 6, there is shown a fifth embodiment in which the coils of one layer (forming one group) are connected to one another in parallel, whereas the coil groups are connected to each other in series.

As in the FIG. 4 embodiment, the inner terminals i41 to i44 of the coils $BI_{41-44}$ in lower layer CI are connected to one another by inner leads $Ci_{41}$ to $Ci_{44}$ formed by metallizations or tracks that converge towards the centre of device 14, and more particularly towards the axis AP of substrate 30.

Leads $Ci_{41-44}$ intersect in the vicinity of axis AP and are connected at the intersection to a central "inter planar" junction 80.

Similarly, inner terminals i45 to i48 of coils $BS_{45-48}$ are electrically connected to one another by converging leads $Ci_{45-48}$. These leads are also connected to "interplanar" junction 80 at their intersection.

Thus, all of these coils' inner terminals are electrically connected to one another.

Moreover, the outer terminals e41 to e44 of the lower coils are connected to a partial peripheral lead 87 via outer leads $Ce_{41-44}$. Lead 87 is preferably provided on lower layer CI.

The outer terminals e45 to e48 of the upper coils are connected to another partial peripheral lead 85 via the outer leads $Ce_{45-48}$ of these coils. Lead 85 is preferably provided on the upper layer. Coil device 14 thus comprises two partial peripheral leads 85 and 87 each connected to a group of coils and provided in different (upper or lower) planes. These peripheral leads are respectively provided with leads 86 and 83 that connect them to a single control element $C_{12}$. In this embodiment, the inner and outer terminals can also form either the input or the output for the current.

It is preferable however for the turns of overlapping coils to be wound (in relation to the inner terminal) in identical directions. This embodiment is of particular interest inasmuch as it helps to reduce the overall resistance of the electric circuit formed by the coils.

Referring back to FIGS. 2a and 2b, the coil devices that have just been described are of considerable interest as they improve the efficiency of a micromotor, and make it possible for it to operate equally well as a stepping motor, a bidirectional motor or a continuous rotation motor, without increasing its thickness.

As will be apparent from FIGS. 2a and 2b, semi-conductive substrate 30 can be hollowed out in its rear surface F2 to produce a recess 100 in which can be housed at least part of the second disc 16 of magnetically soft material forming the stator part (shown here in broken lines), thereby considerably decreasing the height of the air gap from a value E to a value $E_r$. Recess 100, also termed "tub", is produced by etching in the monocrystal that forms substrate 30, either, in one case, for a limited length of time, or, in a second case, by the prior diffusion into semi-conductive substrate 30 of boron atoms that will stop the etching action.

Thus, substrate 30 where it is hollowed out, i.e. beneath the coils, drops from a thickness K of about $500 \cdot 10^{-6}$ meter (500 microns) to a thickness Kr of about 60 to $80 \cdot 10^{-6}$ meter (60 to 80 microns). Semi-conductive substrate 30 is thus formed of two characteristic portions 30a and 30b. Portion 30b thus accommodates disc 16 which is provided to this end with a protuberance 16a of substantially frusto-conical shape complementary to recess 100. Portion 30b has an annular shape to stiffen coil device 14 thereby preventing the latter from breaking during handling and mounting.

It should be added in this connection that the substrate 30, beneath the coils, i.e. part of portion 30a, forms a "membrane" so fine that it is necessary for it to be supported mechanically by portion 30b.

When it is desired to form a layer of boron atoms to limit the etching action depthwise, portion 30b constitutes a base into the top part of which a boron layer 95 is diffused and on which an epitaxial layer is grown to form an other portion 30a of semi-conductive substrate 30. It is on this epitaxial layer 30a that the successive coil layers are produced in superposed manner, and possibly that control elements $C_1$ to $C_{11}$ are formed.

The method of making the above described embodiments comprises forming on the surface F1 of semi-conductive substrate 30 the first layer CI of coils BI, and preferably simultaneously forming a number of outer leads Ce and/or inner leads Ci, electrically insulating the coils BI so produced, forming the "inter-planar" junctions 60, and then forming over the first layer CI of coils BI, a second layer CS of coils BS and a number of leads for these coils.

More particularly, before depositing the first coils BI of lower layer CI, an electrically insulating (or passivation) layer 200 is formed on substrate 30 by high temperature oxidation. On top of layer 200 which has a thickness of a few angstroms ($10^{-10}$ meter), the coils BI of lower layer CI and some leads are then structured by photolithography, i.e. by surface micro-machining. Coils BI are then covered with an insulating layer 210 made up of a material such as that known under the abbreviation "PSG" (Phospho Silicate Glass), i.e. of phosphorus-doped glass, whereupon insulating layer 210 is etched at those locations where the "inter-planar" junctions are to be provided. These "inter-planar" junctions are then produced and this is followed by structuring the second layer of coils BS and some leads by the same photolithographic process.

The second layer of coils BS is then covered with an insulating and protective layer 220, e.g. made up of the same material as layer 210. This layer forms above the coils a film having a thickness of the order of $1 \cdot 10^{-6}$ meter (1 micron), each "lamination" formed by a coil layer and an insulating layer having a thickness of about $3 \cdot 10^{-6}$ meter (3 microns).

Referring again to FIGS. 2 and 2a, it will be observed that by arranging the coils and layers as proposed, it is possible to produce, at the same time as the first layer CI of coils $BI_{1-4}$, the leads $Ci_{5-8}$ of second layer CS and, conversely, to produce, at the same time as the coils $BS_{5-8}$ of second layer CS, the leads $Ci_{1-4}$ of first layer CI. More generally, it is possible to produce simultaneously the coils and the leads having to be provided in one plane, i.e. on the same layer. With this method therefore it is possible to produce with a minimum of masks and with a minimum amount of time at least two layers of coils on one substrate, in a superposed manner, without substantially increasing the thickness of the micromotor.

Additionally, the resulting stack of coils will enable the efficiency of the micromotor to be increased, either by increasing the volume of the conductive material, as is in particular the case when the coils are directly superposed, or by operating the micromotor in a polyphase mode, in the case where coil groups are angularly offset. These two features may of course be combined, to advantage. Because this stack is produced on one substrate (FIGS. 2a and 2b), the stacking of several layers adds only very little to the overall thickness of the coil device (a few microns per coil "lamina") and therefore not such as to add to the thickness of the micromotor to any appreciable extent.

Besides all these advantages, the production of such stacks on one substrate helps to reduce the air gap (thereby improving the micromotor's efficiency still further) by hollowing out the rear portion of the substrate.

In all of the above embodiments, the upper layer CS and lower layer CI have been described with several coils. But the invention is not limited to this particular case and may involve only one coil per layer.

It is also possible to provide many more than two layers and to have more than four coils per layer.

I claim:

1. An energization coil device comprising:
   a substantially planar support element (30) consisting of a semi-conductive substrate;
   at least one first planar electromagnetic coil (BI) produced by metallization to form a first layer (CI) in the vicinity of one surface (F1) of the semi-conductive substrate (30);
   at least one second planar coil electromagnetic (BS) forming a second layer (CS) superposed on the first layer (CI) in the vicinity of said surface (F1) of the semi-conductive substrate (30), said coil layers (CI, CS) forming a monolithic and integrated electromagnetic arrangement of upper and lower adjacent layers on a common substrate.

2. A device according to claim 1, wherein the first and second layers (CI, CS) include an equal number n of first and second coils, respectively; said first coils (BI) being angularly offset on the substrate (30) in relation to said second coils (BS) by an angle (a) of about 180/n degrees.

3. A device according to claim 2, wherein said coils $(BI_{1-4})$ of one layer have respective outer terminals (e1-4), said coils $(BS_{5-8})$ of the other layer have respective inner terminals (i5-8), and said outer terminals are electrically connected by respective "inter-planar" junctions (60) to respective said inner terminals.

4. A device according to claim 3, wherein each "inter-planar" junction (60) is electrically connected by a respective lead $(Ci_{5-8})$ extending outwardly from the coils and terminated by a pair of fork portions (70) electrically connected to respective control elements $(C_{1-8})$.

5. A device according to claim 4, wherein said lead $(CI_{5-8})$ is disposed in the same plane as said one layer of coils $(BI_{1-4})$.

6. A device according to claim 2, wherein an outer terminal of n−1 coils $(BS_{16-18})$ of one layer (CS) is electrically connected to a nearest inner terminal of a respective one of n−1 corresponding coils $(BI_{11-14})$ of the other layer (CI), an outer terminal of the n coils $(BI_{11-14})$ of said other layer (CI) is electrically connected to a nearest inner terminal of a respective one of the n coils $(BS_{15-18})$ of said one layer (CS), and the outer terminal of one coil $(BS_{15})$ of said one layer (CS) and the inner terminal of one coil $(BI_{12})$ of said other layer (CI) are connected to a control element (C9) to series connect the coils of said layers.

7. A device according to claim 2, wherein inner terminals of the coils $(BI_{21-24}, BS_{25-28})$ of each layer are connected together by leads converging towards a central point of the substrate and are connected by an "inter-planar" junction (80), one of the inner terminals (i22) having a lead (82) extending outwardly from the coils for connection to a control element $(C_{10})$, outer terminals of all coils $(BI_{21-24}, BS_{25-28})$ being connected to one another by a peripheral lead (84) that surrounds said coils at least partially and which is connected to said control element (C10) to parallel connect the two layers of coils.

8. A device according to claim 2, wherein each coil $(BS_{35-38})$ of one of the layers is coaxially disposed in relation to a respective one of the coils $(BI_{31-34})$ of the other layer, the coils $(BS_{35-38})$ of one layer being directly superposed on the coils $(BI_{31-34})$ of the other layer.

9. A method of producing an energization coil device, which comprises forming on one surface (F1) of a semi-conductor substrate (30), by a photolithographic process;
   simultaneously, a first layer of electromagnetic coils (BI) and leads for electrically connecting said electromagnetic coils with a control circuit;
   at least one "inter-planar" junctions (60);
   simultaneously and superposed on the first layer, a second layer of electromagnetic coils (BS) and leads for electrically connecting said coils of said second layer with a control circuit.

10. A method according to claim 9, which comprises forming, at the same time as the first layer (CI) of coils $(BI_{1-4})$, the leads $(Ci_{5-8})$ of the second layer, and, conversely, forming, at the same time as the second layer, (CS) the leads $(Ci_{1-4})$ of the first coil layer (CI).

11. An electromagnetic micromotor comprising a stator (2) and a rotor (1) pivotable on and relatively to said stator (2) about a geometrical axis of rotation (A), said rotor (1) and said stator (2) providing a space forming an air-gap (3) in which are disposed magnetized means (8) and an energization coil device; said energization coil device comprising:
- a substantially planar support element (30) consisting of a semi-conductive substrate;
- at least one first planar electromagetic coil (BI) produced by metallization to form a first layer (CI) in the vicinity of one surface (F1) of the substrate (30); and
- at least one second planar electromagnetic coil (BS) forming a second layer (CS) superposed on the first layer (CI) in the vicinity of said surface (F1) of the semi-conductive substrate (30), said first and second coil layers (CI, CS) forming a monolithic and integrated electromagnetic arrangement of upper and lower adjacent layers on a common substrate.

* * * * *